(12) United States Patent
Elgezabal

(10) Patent No.: US 7,904,726 B2
(45) Date of Patent: Mar. 8, 2011

(54) SYSTEMS AND METHODS FOR SECURING EVENT INFORMATION WITHIN AN EVENT MANAGEMENT SYSTEM

(75) Inventor: Liher Elgezabal, Bilbao (ES)

(73) Assignee: International Business Machines Corporation, Armonk, NY (US)

( * ) Notice: Subject to any disclaimer, the term of this patent is extended or adjusted under 35 U.S.C. 154(b) by 877 days.

(21) Appl. No.: 11/782,791

(22) Filed: Jul. 25, 2007

(65) Prior Publication Data

US 2008/0082585 A1    Apr. 3, 2008

Related U.S. Application Data

(60) Provisional application No. 60/833,550, filed on Jul. 25, 2006, provisional application No. 60/833,849, filed on Jul. 26, 2006.

(51) Int. Cl.
*H04L 9/32* (2006.01)
*G06F 7/00* (2006.01)
*G06F 17/00* (2006.01)

(52) U.S. Cl. ............................. 713/176; 726/22; 707/687

(58) Field of Classification Search ................... 726/22; 713/176
See application file for complete search history.

(56) References Cited

U.S. PATENT DOCUMENTS

| | | | |
|---|---|---|---|
| 7,146,500 B2 * | 12/2006 | Hawkins et al. | 713/176 |
| 7,600,124 B2 * | 10/2009 | Karimisetty et al. | 713/176 |
| 7,636,708 B2 * | 12/2009 | Garcea et al. | 1/1 |
| 7,640,258 B2 * | 12/2009 | Garcea et al. | 1/1 |
| 7,650,512 B2 * | 1/2010 | Karimisetty et al. | 713/193 |
| 7,694,143 B2 * | 4/2010 | Karimisetty et al. | 713/176 |
| 2004/0263901 A1 * | 12/2004 | Critelli et al. | 358/1.15 |
| 2005/0108536 A1 * | 5/2005 | Karimisetty et al. | 713/176 |
| 2005/0108537 A1 * | 5/2005 | Puri et al. | 713/176 |

* cited by examiner

*Primary Examiner* — Christian LaForgia
(74) *Attorney, Agent, or Firm* — Seth Ostrow; Ostrow Kaufman LLP

(57) ABSTRACT

A collecting module, within an event management system, detects and reports security events to a collecting database. The collecting database consolidates the events, and a DSA manager signs and verifies the events by appending a digital signature to designated fields. From the events, the collecting database can automatically generate ABI events, which are digitally signed by the DSA manager. For a new event, the digital signature is appended to the Server Name, the Server Serial, the First Occurrence timestamp, and the NsRaw fields. For an updated event, the digital signature is appended to the Server Name, the Server Serial, the Last Occurrence, and the Tally fields. For ABI events, the digital signature is appended to the Source IP, the Other End, the Count, the Total Score, the Last Occurrence, and the Max Severity fields. The collecting database forwards the signed events to an archival database that provides a historical archive of digitally signed events for forensic purposes.

16 Claims, 8 Drawing Sheets

| ServerName | ServerSerial | FirstOccurrence | LastOccurrence | Tally | NsRaw | NsSignature | NsSigner |
|---|---|---|---|---|---|---|---|
| SECURE | 1234 | 16:18 | 16:50 | 1 | port scan | | |

300

302 ServerName
304 ServerSerial
306 FirstOccurrence
308 LastOccurrence
310 Tally
312 NsRaw
314 NsSignature
316 NsSigner

Fig. 3

| ServerName | ServerSerial | FirstOccurrence | LastOccurrence | Tally | NsRaw | NsSignature | NsSigner |
|---|---|---|---|---|---|---|---|
| SECURE | 1234 | 16:18 | 16:50 | 10 | port scan | aljkfddojsdf | DSA1 |

300
302 — ServerName
304 — ServerSerial
306 — FirstOccurrence
308 — LastOccurrence
310 — Tally
312 — NsRaw
314 — NsSignature
316 — NsSigner

Fig. 4

| ServerName | ServerSerial | FirstOccurrence | NsRaw | NsSignature | NsSigner |
|---|---|---|---|---|---|
| SECURE | 1234 | 16:18 | port scan | aljkfddojsdf | DSA1 |

| ServerName | ServerSerial | LastOccurrence | Tally | NsSignature | NsSigner |
|---|---|---|---|---|---|
| SECURE | 1234 | 16:24 | 2 | fldjsdfljdsinfd | DSA1 |
| SECURE | 1234 | 16:36 | 5 | fkjslfjjdidnfdi | DSA1 |
| SECURE | 1234 | 16:50 | 10 | fposjfddnlfiodi | DSA1 |

| Source IP | Other End | Count | Total Score | LastOccurrence | Max severity | Severity | NsSignature | NsSigner |
|---|---|---|---|---|---|---|---|---|
| 192.168.1.1 | 3 | 4 | 35 | 16:50 | 4 | 4 | | |

Fig. 7

| Source IP | Other End | Count | Total Score | LastOccurrence | Max severity | Severity | NsSignature | NsSigner |
|---|---|---|---|---|---|---|---|---|
| 192.168.1.1 | 3 | 4 | 35 | 16:50 | 4 | 4 | aljkfddojsdf | DSA1 |

SYSTEMS AND METHODS FOR SECURING EVENT INFORMATION WITHIN AN EVENT MANAGEMENT SYSTEM

CLAIM OF PRIORITY

This application claims priority to the following provisional applications, each of which is hereby incorporated herein by reference in its entirety:

U.S. Provisional Patent Application No. 60/833,550, filed on Jul. 25, 2006, entitled, "SYSTEMS AND METHODS FOR SECURING EVENT INFORMATION WITHIN AN EVENT MANAGEMENT SYSTEM;" and U.S. Provisional Patent Application No. 60/833,849, filed on Jul. 26, 2006, entitled "SYSTEMS AND METHODS FOR SYNCHRONIZING A PLURALITY OF DATABASE SYSTEMS IN A MULTI-TIERED INFORMATION MANAGEMENT SYSTEM."

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever

CROSS-REFERENCE TO RELATED PATENTS

U.S. Pat. No. 6,694,362, entitled "Method and System for Network Event Impact Analysis and Correlation with Network Administrators Management Policies and Procedures," issued Feb. 17, 2004, is related and is incorporated herein by reference in its entirety.

FIELD OF THE INVENTION

The present invention is directed to managing network faults, and more particularly to improved methods for securing and protecting the integrity of event information.

BACKGROUND OF THE INVENTION

Network visibility has increasingly become an important factor in achieving profitability and operational efficiency. When an operational parameter lies outside of a prescribed threshold or range, an alarm is issued to provide notice of this event. The event could be the result of hardware failures, software failures, poor performance, network instability, improper configuration, resource shortages, etc. As networks continue to grow and mature, operations support personnel must be able to quickly and more accurately respond to such network failures and other events. Being able to timely respond to the event is fundamental to effective event processing.

Typically, events are reported to one or more databases that collect, filter, and process the information for review and resolution by operations support personnel. For widely distributed networks, the quantity of databases collecting and processing events increases proportionally with the breadth and depth of the network, and as a result, greater emphasis must be placed on being able to accurately consolidate and present the event information. In a multi-tiered environment, a supervisory information management system at a higher tier can be deployed to consolidate information that has been collected at a lower tier of database.

A challenge facing event management systems involves security management. A critical objective of security management is to preserve the accuracy and integrity of the collected event information, especially in government networks, to thereby make the information useful for forensic purposes. To that end, it is important to be able to control access to network resources, prevent sabotage, secure sensitive information, and detect unauthorized changes and corruption of stored information. Concerns surrounding the preservation of data integrity and data accuracy are magnified within widely distributed and/or multi-tiered environments, where it is significantly difficult to maintain the security and integrity of information as multiple instances of the information flows throughout the environment.

Therefore, a need exists for improved solutions that can collect and secure event information in a widely distributed network, and facilitate more timely resolution of network faults.

BRIEF SUMMARY OF THE INVENTION

A security management system and method are provided to protect the integrity and validity of event information distributed throughout an event management system. The event management system includes a plurality of collecting modules, a collecting database, an archival database, and a digital source adaptor (DSA) manager. The collecting modules (e.g., probes and/or monitors) actively and passively detect and report security events to the collecting database. The collecting database stores, consolidates, and otherwise processes the reported events in accordance with embodiments of the present invention.

The DSA manager includes data integrity features that allow a policy to sign and verify the reported events. Thus, the DSA manager is configurable to produce a digital signature for events at the time of insert or update. In an embodiment, the digital signature is appended to a concatenation of event identification fields that uniquely identifies the reported event.

The collecting database can store or forward the signed event to an upper tier, including, for example, the archival database. The archival database provides a historical archive of digitally signed events. The historical archive can contain all event records, with or without deduplication. In an embodiment, the archive of signed events is made available for forensic support.

In an embodiment, the collecting database collects raw events and automatically generates Abnormal Behavior Indicator (ABI) events, which are digitally signed by the DSA manager. An ABI event is a grouping of security alerts based on an IP address, and indicates abnormal behavior on the device at the IP address. In an embodiment, the digital signature for an ABI event is appended to a concatenation of event identification fields that uniquely identifies the ABI event.

The digital signature can also be applied to verify event information within the event management system. By verifying the signature appended to an event record, the digital signature can be utilized to determine whether the original event information has been modified. During verification, the DSA manager can identify the signer of the signed event, and retrieve its certificate from a certification authority.

BRIEF DESCRIPTION OF THE DRAWINGS

The foregoing and other aspects of the invention will become more apparent from the following description of illustrative embodiments thereof and the accompanying drawings, which illustrate, by way of example, the principles of the invention. In the drawings:

FIG. 3 illustrates event information for providing a security event signature in accordance with an embodiment of the present invention;

FIG. 4 illustrates event information for providing a security event signature in accordance with another embodiment of the present invention;

FIG. 5 illustrates designated fields for a security event signature in accordance with an embodiment of the present invention;

FIG. 6 illustrates an event table for storing security event signatures in accordance with an embodiment of the present invention;

FIG. 7 illustrates event information for providing an ABI event signature in accordance with an embodiment of the present invention; and FIG. 8 illustrates event information for providing an ABI event signature in accordance with another embodiment of the present invention.

DETAILED DESCRIPTION OF ILLUSTRATIVE EMBODIMENTS

The present invention will now be described in detail with reference to the drawings, which are provided as illustrative examples of the invention so as to enable those skilled in the relevant art(s) to practice the invention.

System Overview

Figure 1:
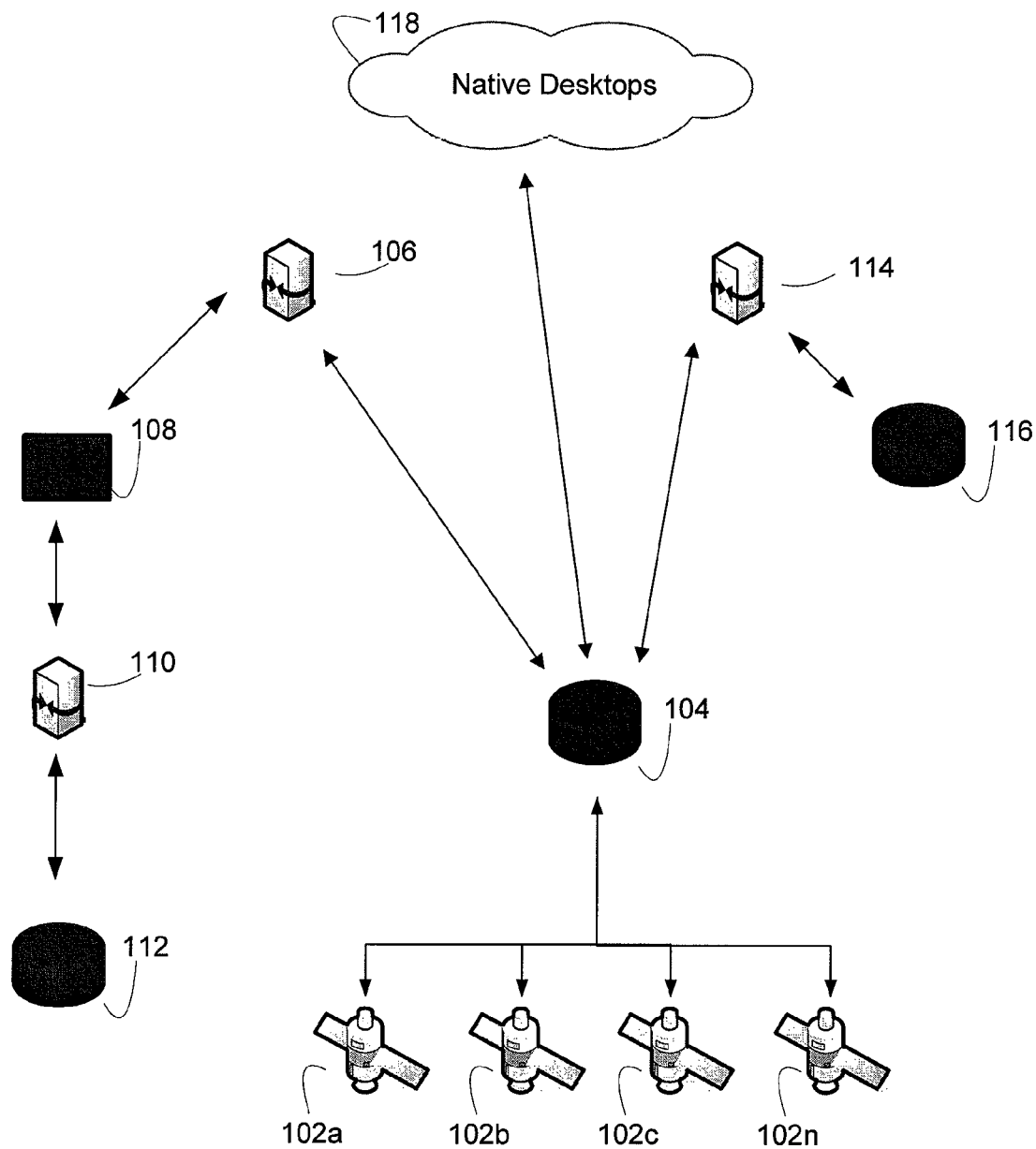
FIG. 1 illustrates an event management system in accordance with an embodiment of the present invention.

A security management system and method, as herein described, include a mechanism for ensuring data security, accuracy, and integrity while event information is distributed from source to destination. FIG. 1 illustrates an event management system 100 in accordance with an embodiment of the present invention. Although event management system 100 is described with reference to securing event information for distribution among databases, it should be understood that the concepts described herein could be extended to include the security management of any type of information within any type of information management system.

Event management system 100 includes a plurality of collecting modules 102a-102n, a collecting database 104, a digital source authority (DSA) gateway 106, a DSA manager 108, an entrust gateway 110, an entrust database 112, a collecting-to-archival gateway 114, an archival database 116, and one or more native desktops 118. Collecting modules 102a-102n include a plurality of probes and/or monitors, which actively and/or passively collect events (e.g., faults, alerts, exceptions, alarms, warnings, failures, or the like) from a plurality of communication entities. The communication entities include hardware, software, and/or firmware components of a wired and/or wireless communication infrastructure. As such, the communication entities represent devices; links (including bandwidth, latency, utilization, or the like); software applications (e.g., database applications, e-commerce applications, or the like); services (e.g., email services, wireless voice services, business units, or the like); service infrastructure (e.g., Dynamic Host Configuration Protocol (DHCP), Domain Name System (DNS), File Transfer Protocol (FTP), Internet Control Message Protocol (ICMP), Network News Transfer Protocol (NNTP), Network Time Protocol (NTP), Transmission Control Protocol (TCP) Port, Remote Authentication Dial-In Service (RADIUS), or the like); data centers; element management systems; other network management systems; or the like. The communications entities can be components of a wired and/or wireless local area network (LAN), virtual LAN (VLAN), wide area network (WAN), or metropolitan area network (MAN), such as an organization's intranet, a local internet, the global-based Internet (including the World Wide Web (WWW)), an extranet, a virtual private network (VPN), licensed wireless telecommunications spectrum for digital cell (including CDMA, TDMA, GSM, EDGE, GPRS, CDMA2000, WCDMA FDD and/or TDD or TD-SCDMA technologies), or the like.

The collecting modules 102a-102n can be hardware, software, and/or firmware, and are communicatively coupled to collecting database 104. The events reported by collecting modules 102a-102n are stored, consolidated, and processed in collecting database 104. For example, collecting database 104 can be configured to analyze the raw events stored within the database records, and automatically generate Abnormal Behavior Indicator (ABI) events. An ABI event is a grouping of security alerts based on an IP address, and indicates abnormal behavior on a communication entity at the IP address. ABI events are useful for tracking rogue activities (e.g., cyber attacks, viruses, spyware, malware, spam, distributed denial of service activities, etc.) that are being directed at a communication entity, or that is being distributed from a communication entity. If a communication entity is an intentional or unintentional source of a rogue activity, the ABI events can be grouped by the source IP address to thereby monitor or detect the initiator of the rogue activity. If a communication entity is an intentional or unintentional target or recipient of a rogue activity, the ABI events can be grouped by the destination IP addresses to thereby monitor or detect the target of the rogue activity. Additional information that can be extracted for the ABI events include the quantity of communication entities involved at the source and/or destination, severity levels, timing of the rogue activities, or the like.

DSA gateway 106 enables communications between collecting database 104 and DSA manager 108. DSA manager 108 selects and analyzes the impact of specific events on applications, services, businesses, customers, or the like. The impact analysis includes event enrichment, event aggregation, event suppression, execution of automated processes and policies executions, response and escalation, execution of management policies, or any combination thereof.

For example, DSA manager 108 can enrich the event information stored at collecting database 104 by linking the additional information with each event. Leveraging information from a variety of sources, DSA manager 108 can complete missing information, identify a source or destination for a collected event, identify communication entities affected by a fault, etc. Exemplary sources for the information applied to enrich the event information include business and customer data from provisioning and inventory systems, trouble ticketing systems, Enterprise Application Integration Buses (EAI Buses), Lightweight Directory Access Protocol (LDAP) directories, and other existing data sources. After enriching the event information, the enriched information can be utilized by operations support systems (OSS) teams to define resolution policies and take immediate actions to resolve faults.

In an embodiment, the DSA manager 108 is implemented by utilizing a business and service impact analysis system, such as the NETCOOL®/IMPAC™ product that is available at Micromuse Inc. (a subsidiary of International Business Machines Corporation). The NETCOOL®/IMPACT™ product includes mechanisms for accessing security keys, or the like, that are stored in external databases or files through one or more data source adaptors. An exemplary description of the NETCOOL®/IMPACT™ product is described in U.S. Pat. No. 6,694,362, entitled "Method and System for Network Event Impact Analysis and Correlation with Network Administrators Management Policies and Procedures," issued Feb. 17, 2004, the disclosure of which is hereby incorporated by reference in its entirety.

DSA manager 108 includes data integrity features that allow a policy to be executed to sign and verify a string. DSA manager 108 detects when new events have been inserted in collecting database 104. DSA manager 108 is configurable to produce a digital signature for the new events at insert time. DSA manager 108 also produces a digital signature for any ABI events generated by collecting database 104.

In an embodiment, the digital signature includes information that is encrypted with an entity private key and is appended to the event information to assure a recipient of the authenticity and integrity of the signed event. Therefore, the digital signature provides evidence that the event was signed by the entity that owns, or has access to, the private key or shared secret symmetric key (e.g., DSA manager 104).

Entrust gateway 110 supports the digital signature processes by enabling communications between DSA manager 108 and entrust database 112. Entrust gateway 110 includes a digital library that provides credential management functions used by entrust gateway 110 to connect to entrust database 112 and manage user digital identities. In an embodiment, the credential management functions include credential creation, credential recovery, and user status.

With respect to the credential creation functions, a credentials file is provided that includes a set of critical cryptographic information about a user. Entrust gateway 110 creates the credentials file (also referred to as an "entrust profile" or "user profile") during an initial setup between entrust gateway 110 and entrust database 112, and the file is subsequently stored at entrust database 112. Upon setup, an encryption public key and signing private key are created that are based upon the setting from entrust database 112.

The credential recovery function enables entrust gateway 110 to automatically perform a recovery operation if the credentials data is lost or corrupted at the entrust gateway 110. Recovering user credentials involves three operations. First, it requires the generation of a new signing key pair. Second, it requires the secure retrieval from entrust database 112 of the current keys and certificates. Finally, it requires verification of public certificates by entrust database 112.

Finally with respect to the user status function, user credentials contain the information (e.g., keys, certificates, etc.) needed to authenticate a user to entrust database 112. User credentials also contain the information (e.g., keys, certificates, etc.) needed to enable the user to perform cryptographic operations.

The process of logging-in at entrust database 112 involves reading and verifying the user credentials for entrust gateway 110. Verification involves making sure that the keys that the user credentials contain are intact and valid. If any of the user keys are outdated or need to be updated, the convenient time to make this determination and to perform the update operation is during the login process. In an embodiment, entrust gateway 110 connects to entrust gateway 112 (or some other certification authority) at login time, and updates the keys automatically if they have expired.

Entrust database 112 also provides certification management. A certificate is a type of digital identity card attesting that a particular public key belongs to a particular entity. Certificates have a limited period of validity and are digitally signed by a trusted authority. Certificates can be verified by anyone having access to the public key of the signing authority. Each certification authority has to take care to label every handled certificate with a unique serial number for unequivocally identifying it.

Certification authorities also maintain certification revocation lists of certificates that have been expired for some reason and are no longer valid. Certification authorities are organized in tree-like structures, where certification authorities also are used for certifying other certification authorities. The certification authority being located at the highest level of such a tree is called the top-level or root certification authority and self-signs its public key with its own private key.

Publicly available certification policies specify guidelines that may be referenced by an entity for querying for the strategy a particular certification authority may follow for issuing and verifying certificates. Certification policy publishing certification authorities are called Policy Certification Authorities (PCAs) and prescribe the minimal policy requirements for all certification authorities located at a lower level in the certification authority tree.

When DSA manager 108 digitally signs an event (as discussed above), a certificate is published to attest that DSA manager 108 owns the private key or shared secret symmetric key used to encrypt the digital signature. Entrust database 112 can generate the key, publish the certificate, or both. Entrust gateway 110 provides the key to DSA manager 108 for the digital signature. If DSA manager 108 subsequently needs to verify a previously produced digital signature, entrust gateway 110 can retrieve the certificate from entrust database 112 for signature verification.

Therefore, entrust database 112 can operate as the certification authority and Directory (e.g., LDAP) that publishes the certificates used by DSA manager 108 to produce or verify digital signatures. In other embodiments, a third party source operates as a certification authority or Directory. Nonetheless, entrust gateway 110 is configurable to check the validity of such certificates, and monitor the Certification Revocation List (CRL) published by the certification authority.

Collecting-to-archival gateway 114 provides a communications interface between collecting database 104 and archival database 116. Gateway 114 enables the movement of signed events from collecting database 104 to archival database 116, which is a historical archive of digitally signed events. The historical archive can contain all event records, and no deduplication is required for the archive. The archive of signed events can be made available for forensic support.

In an embodiment, DSA manager 108 returns the signed events to collecting database 104 that, in turn, delivers the signed events to archival database 116 via gateway 114. In another embodiment, DSA manager 108 delivers the signed events directly to gateway 114 for delivery to archival database 116. In other embodiments, the signed events are stored and archived at collection database 104, without forwarding the signed events to another database (e.g., archival database 116).

System 100 also includes one or more native desktops 118. A network operations center (NOC) user, for example, can operate one of the native desktops 118 to query, produce reports, and/or issue updates to the event information recorded at archival database 116, or at any other object server of system 100.

The components of event management system 100 can support wired, wireless, or both transmission media, including satellite, terrestrial (e.g., fiber optic, copper, UTP, STP, coaxial, hybrid fiber-coaxial (HFC), or the like), radio, free-space optics, microwave, and/or any other form or method of transmission. The system components can be configured to support the standard Internet Protocol (IP) developed to govern communications over public and private Internet backbones. The protocol is defined in Internet Standard (STD) 5, Request for Comments (RFC) 791 (Internet Architecture Board). The communication entities also support transport protocols, such as, TCP, User Datagram Protocol (UDP), Real Time Transport Protocol (RTP), or Resource Reservation Protocol (RSVP). The transport protocols support various types of data transmission standards, such as FTP, Hypertext Transfer Protocol (HTTP), Simple Network Management Protocol (SNMP), Network Time Protocol (NTP), Synchronous Optical Network (Sonet), Signaling System 7 (SS7), Asynchronous Transfer Mode (ATM), Frame Relay, X.25, Integrated Services Digital Network (ISDN), all types of Digital Subscriber Lines (xDSL), Voice over IP (VoIP), Ethernet protocol (e.g., switched or gigabit), Fiber Distributed Data Interface (FDDI) protocol, Border Gateway Protocol (BGP), Open Shortest Path First (OSPF), spanning tree protocol (STP), Hot Standby Routing Protocol (HSRP), Network Address Translation (NAT), Multiprotocol Label Switching (MPLS), Enhanced Inter-Gateway Routing Protocol (EIGRP), or the like.

Operational Overview of Event Signature and Verification

Figure 2:
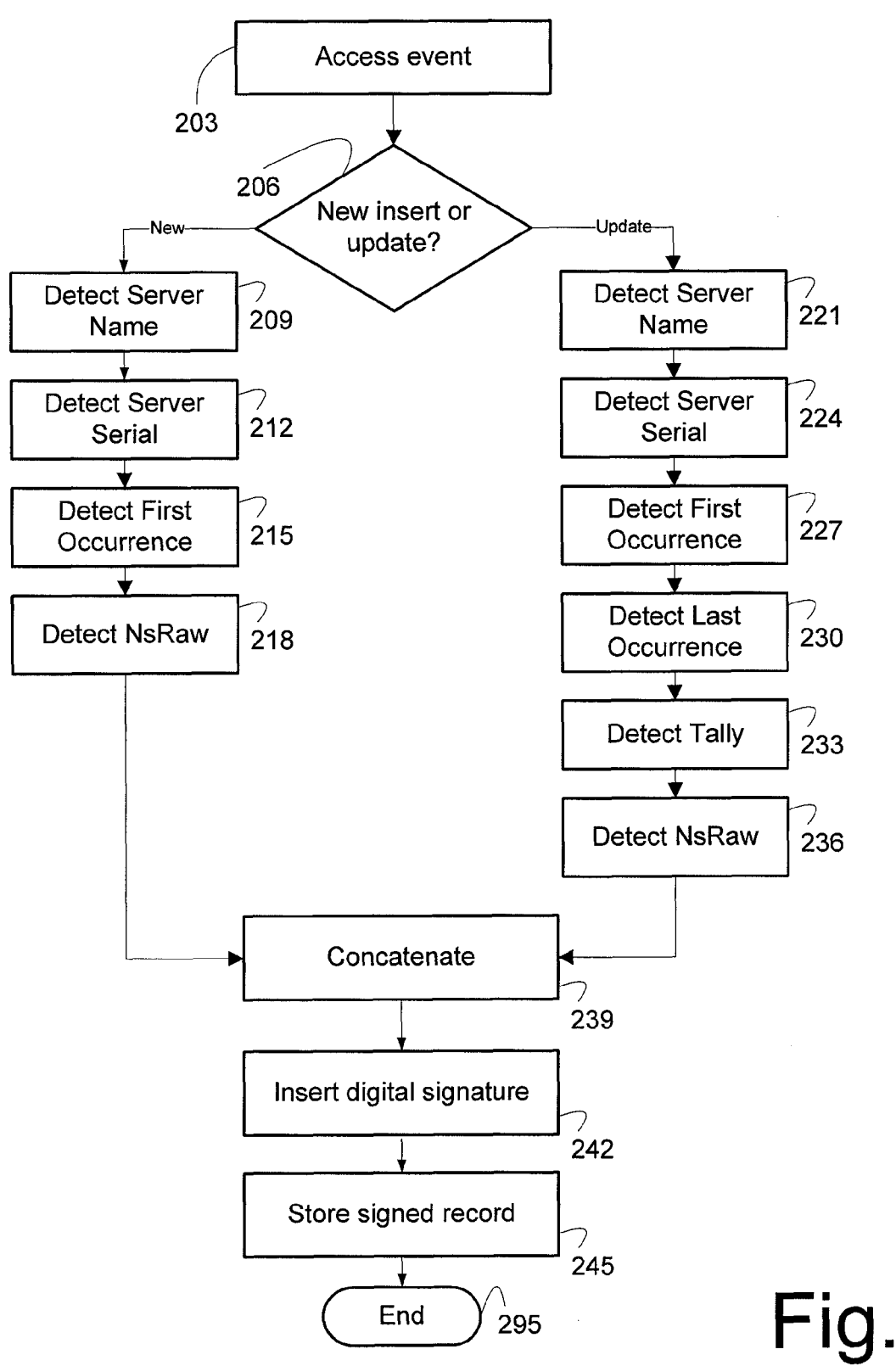
FIG. 2 illustrates an operational flow for digitally signing event information in accordance with an embodiment of the present invention.

As discussed above, DSA manager 108 is operable to sign events as soon as they are inserted in collecting database 104. Referring to FIG. 2, an example of a general operational flow is described for digitally signing event information within event management system 100. More specifically, flowchart 200 illustrates a control flow for inserting a digital signature for events reported to collecting database 104. At step 203, an event is accessed by DSA gateway 106, and forwarded to DSA manager 108. At step 206, it is determined whether the event is a new insert or an existing row that includes updates. If the event is a new insert, control passes to step 209 and a Server Name for the row is detected. The Server Name is a name that uniquely identifies the system component that inserts, updates, or reinserts an event. In this case, the system component is collecting database 104. Therefore, the Server Name is the identifier for collecting database 104.

At step 212, a Server Serial is detected for the new insert. The Server Serial is the serial number of the event on the system component that inserts, updates, or reinserts an event. Once again in this case, the Server Serial is the serial number of the event on collecting database 104.

At step 215, a First Occurrence value is detected. The First Occurrence is a timestamp reflecting the current time that the event was first inserted by the inserting, updating, or reinserting system component (e.g., collecting database 104).

At step 218, an NsRaw value is detected for the event. The NsRaw value is the raw probe data associated with the event.

Referring back to step 206 if the event is determined to be an existing row that has been updated or, in the case of deduplication, reinserted, control passes to step 221. At step 221, a Server Name for the row is detected for the system component that has updated or reinserted the event. In this case, the system component is collecting database 104.

At step 224, a Server Serial is detected that indicates the serial number of the event on the updating or reinserting system component (e.g., collecting database 104). At step 227, a First Occurrence value is detected, and at step 230, a Last Occurrence value is detected. The Last Occurrence is a timestamp reflecting the current time of the last update or reinsert of the event at the updating or reinserting system component (e.g., collecting database 104).

At step 233, a Tally value is detected for the event. The Tally is the quantity of times that the same event has been reinserted and/or updated. Examples of systems and methods for generating and detecting Tally values are described in U.S. patent application entitled "Systems and Methods for Synchronizing a Plurality of Database Systems in a Multi-Tiered Information Management System," filed Jul. 26, 2006 and assigned Ser. No. 60/833,849, which is incorporated herein by reference in its entirety.

At step 236, an NsRaw value is detected for the event. After detecting the NsRaw value at either step 218 or step 236, the detected values for the new insert or the updated/reinserted row are concatenated at step 239. For new events, the concatenated data include the Server Name, Server Serial, First Occurrence, and NsRaw values. For updated or reinserted events, the concatenated data include the Server Name, Server Serial, First Occurrence, Last Occurrence, Tally, and NsRaw values. For both instances, the concatenated data uniquely identifies the respective new, updated, or reinserted event.

At step 242, DSA manager 108 signs the concatenation of these values with a digital signature. An example of a digital signature can be explained with reference to FIG. 3, which illustrates event information for providing a security event signature in accordance with an embodiment of the present invention. The event information includes a plurality of fields that have been concatenated into an event row 300. The event row includes a Server Name field 302, a Server Serial field 304, a First Occurrence field 306, a Last Occurrence field 308, a Tally field 310, an NsRaw field 312, an NsSignature field 314, and an NsSigner field 316. The input values for fields 302-312 are described above with reference to steps 209-236. NsSignature field 314 and NsSigner field 316 provide the signature and signer identity, respectively, generated by DSA manager 108. In FIG. 3, NsSignature field 314 and NsSigner field 316 are blank because the security event has not been signed.

After signing, the concatenated fields may resemble the event row 300 illustrated in FIG. 4, which shows event information for providing a security event signature after the information has been signed by DSA manager 108. As can be seen, NsSignature field 314 and NsSigner field 316 have been populated with the signature and signer identity information.

While appending the digital signature, only six of the eight fields depicted in event row 300 are utilized. The six fields include the Server Name field 302, Server Serial field 304, First Occurrence field 306, NsRaw field 312, NsSignature field 314, and NsSigner field 316.

FIG. 5 illustrates an embodiment of the designated fields for providing a digital signature for a security event. Note that the Last Occurrence field 308 and the Tally field 310 are not used in the signature. These fields will change over time, whereas the fields depicted in FIG. 5 should remain constant. As a result, the event signature should remain constant in time, even if the same event comes in later and increases the value in Tally field 310 after the original event has arrived.

As discussed, DSA manager 108 can detect updates to an event following the initial signature of the original insert. Updates and/or reinserts should only increase the Tally field 310 and the Last Occurrence field 308. The NsRaw field 312 should not be affected. Therefore for updated events, DSA manager 108 will sign the concatenation of the following fields: Server Name field 302, Server Serial field 304, First Occurrence field 306, Last Occurrence field 308, Tally field 310, and NsRaw field 312 (as shown in FIG. 4). However, the signature for the updated event is saved as a separate event with the following fields: Server Name field 302, Server Serial field 304, Last Occurrence field 308, Tally field 310, NsSignature field 314, and NsSigner field 316. FIG. 6 illustrates an embodiment of these designated fields, which are used to provide a digital signature for an updated security event.

Referring back to FIG. 2 at step 245, the signed concatenated records for either new or updated events are stored in an appropriate table as a new row. Storing the values separately will facilitate the ability to securely keep track of how the count field increases, and the ability to validate when the last event arrived. For new event, the format depicted in FIG. 5 can be used. For updates/reinserts, the format depicted in FIG. 6 can be used. Upon recordation of the signed fields, the control flow ends as indicated at step 295.

The event signature of the present invention can also be utilized to verify event information within event management system 100. First, the event signature can be applied to verify that the original event information has not been tampered with by verifying the signature attached to the event. This guarantees that the NsRaw field 312 and the First Occurrence field 306 have not been modified.

Second, if knowing the value of the Last Occurrence field 308 is required, the records corresponding to a previous event (having the same Server Name and Server Serial) should be found in the table of signed concatenated events (described at step 245). As such, a user can locate the Last Occurrence value or the Tally value, and perform the verification against the signature stored in the table.

ABI events are summary events generated by collecting database 104. DSA manager 108 can periodically sign ABI events and create a newly signed event. In an embodiment, the ABI signed events are the only events that are forwarded to an upper tier (e.g., archival database 116).

The fields or values that can be used to provide a digital signature for ABI events depends on whether the events are source ABI events or destination ABI events. For source ABI events, the digital signature can include values for RemoteNodeAlias, NsConfidentiality, NsScore, NsTotalScore, FirstOccurrence, NsIntegrity, and Severity. For destination ABI events, the digital signature can include values for LocalNodeAlias, NsConfidentiality, NsScore, NsTotalScore, FirstOccurrence, NsIntegrity, and Severity.

This can be further explained with reference to FIG. 7, which illustrates an embodiment of concatenated fields for an event row 700 that can be utilized to provide an ABI event signature. Event row 700 represents an unsigned ABI event. Note that the alias names are used instead of real field names. As such, event row 700 includes a Source IP field 702, an Other End field 704, a Count field 706, a Total Score field 708, a Last Occurrence field 308, a Max Severity field 712, an NsSignature field 314, and an NsSigner field 316.

FIG. 8 illustrates another embodiment of the concatenated fields for event row 700. However, the event row 700 has been signed as shown by the population of NsSignature field 314 and an NsSigner field 316.

DSA manager 108 performs the verification process for the ABI events, as described above with reference to security events. During verification, DSA manager 108 will find out who signed the event, and will retrieve its certificate from entrust database 112. Using the public key on the certificate, DSA manager 108 can verify the signature.

It should be understood that various aspects of the embodiments of the present invention could be implemented in hardware, firmware, software, or a combination thereof. In such an embodiment, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). Moreover, it is not intended for any term in the specification or claims to be ascribed an uncommon or special meaning unless explicitly set forth as such. Further, the present invention encompasses present and future known equivalents to the known components referred to herein by way of illustration. While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computerized method of protecting the integrity of network events, the method comprising:

storing an event record reported from one or more communication entities, the event record including abnormal activities corresponding to the one or more communication entities;

reading a first set of event fields in the event record, the first set of event fields including information that uniquely identifies the event record;

electronically generating, via a processing device, a first digital signature based on the read event fields;

electronically appending, via the processing device, the first digital signature to a concatenation of the first set of event fields to thereby produce a signed event record;

electronically determining, via the processing device, whether tampering of the first set of event fields in the event record has occurred;

upon determining that the first set of event fields have not been tampered with, storing a second set of event fields in the event record, information in the second set of event fields is based on the information of the un-tampered first set of event fields;

electronically generating, via the processing device, a second digital signature based on the second set of event fields; and electronically appending, via the processing device, the second digital signature to a concatenation of the second set of event fields in the signed event record.

2. The method of claim 1, wherein the event fields include information that identifies an entity first accessing the event record from a reporting communication entity.

3. The method of claim 1, wherein the event fields include information that identifies a time when an entity first accesses the event record from a reporting communication entity.

4. The method of claim 1, further comprising:
appending a signature reference value; and
appending a signer identifier.

5. The method of claim 1, further comprising:
determining the event record includes a new insert; and
concatenating a timestamp to produce the concatenation of event identification fields, the timestamp indicating a time when an entity first accesses the new insert from a reporting communication entity.

6. The method of claim 1, further comprising:
determining the event record includes updated event information; and
concatenating a timestamp to produce the concatenation of event identification fields, the timestamp indicating a time when an entity first accesses the updated event information from a reporting communication entity.

7. The method of claim 1, further comprising:
applying the second digital signature appended to the signed event record to verify event updates.

8. A computerized method of protecting the integrity of network events, the method comprising:
accessing an Abnormal Behavior Indication (ABI) security event record reported from one or more communication entities, the event record including abnormal activities corresponding to the one or more communication entities;

detecting a first set of event identification fields associated with the event record, the first set of event fields including information that uniquely identifies the event record;

electronically appending, via a processing device, a first digital signature to a concatenation of the first set of event identification fields to thereby produce a signed event record;

electronically determining, via the processing device, whether tampering of the first set of event fields in the event record has occurred;

upon determining that the first set of event fields have not been tampered with, detecting a second set of event identification fields in the event record, information in the second set of event fields is based on the information of the un-tampered first set of event fields; and electronically appending, via the processing device, a second digital signature to a concatenation of the second set of event fields in the signed event record.

9. The method of claim 8, wherein the event fields include information that identifies a source IP address for the event record.

10. The method of claim 8, wherein the event fields include information that identifies a destination IP address for the event record.

11. The method of claim 8, further comprising:
applying the second digital signature appended to the signed event record to verify event updates.

12. A computer program product comprising a non-transitory computer useable medium having computer readable program code functions embedded in the medium for causing a computer to protect the integrity of network events, the computer program product comprising:
a first computer readable program code function that causes the computer to store an event record reported from one or more communication entities, the event record including abnormal activities corresponding to the one or more communication entities;

a second computer readable program code function that causes the computer to read a first set of event fields in the event record, wherein the first set of event fields include information that uniquely identifies the event record;

a third computer readable program code function that causes the computer to generate a first digital signature based on the read event fields;

a fourth computer readable program code function that causes the computer to append the first digital signature to a concatenation of the first set of event fields to thereby produced a signed event record;

a fifth computer readable program code function that causes the computer to determine whether tampering of the first set of event fields in the event record has occurred;

upon determining that the first set of event fields have not been tampered with, a sixth computer readable program code function that causes the computer to detect a second set of event identification fields in the event record, information in the second set of event fields is based on the information of the un-tampered first set of event fields;

a seventh computer readable program code function that causes the computer to generate a second digital signature based on the second set of event fields; and an eighth computer readable program code function that causes the computer to append the second digital signature to a concatenation of the second set of event fields in the signed event record.

13. The computer program product according to claim 12, wherein the event fields include information that identifies an entity first accessing the event record from a reporting communication entity.

14. The computer program product according to claim 12, wherein the event fields include information that identifies a time when an entity first accesses the event record from a reporting communication entity.

15. A system for protecting the integrity of network events, comprising:
a computing device, the computing device further comprising:
a collecting database configured to store an event record reported from one or more communication entities, the event record including abnormal activities corresponding to the one or more communication entities; and
a digital signature manager adapted to read a first set of event fields in the event record, wherein the first set of event fields include information that uniquely identifies the event record, wherein the digital signature manager is further adapted to append a first digital signature to a concatenation of the first set of event fields to thereby produce a signed event record, determine whether tampering of the first set of event fields in the event record has occurred, store a second set of event fields in the event record upon determination that the first set of event fields have not been tampered with, wherein information in the second set of event fields is based on the information of the un-tampered first set of event fields, and append the second digital signature to a concatenation of the second set of event fields in the signed event record.

16. The system of claim 15, further comprising:
a plurality of collecting modules, each module configured to receive event information from one or more communication entities and further configured to forward the event information to the collecting database.

* * * * *